United States Patent [19]
Young et al.

[11] Patent Number: 5,682,180
[45] Date of Patent: Oct. 28, 1997

[54] MULTI-COLOR ELECTRONIC DISPLAY UTILIZING OPPONENT COLORS

[75] Inventors: Richard Allen Young, Troy; George Wolfram Smith, Birmingham; Nuno Artur Vaz, West Bloomfield, all of Mich.

[73] Assignee: General Motors Corporation, Detroit, Mich.

[21] Appl. No.: 534,991

[22] Filed: Jun. 8, 1990

[51] Int. Cl.$^6$ ............................................. G09G 1/28
[52] U.S. Cl. ........................... 345/150; 345/88; 345/22; 348/808; 349/97
[58] Field of Search ........................... 340/701, 703, 340/784; 358/57, 64; 350/347, 332; 345/150, 151, 87, 88, 113, 22, 32; 359/63, 64; 348/808, 741, 776, 809

[56] References Cited

U.S. PATENT DOCUMENTS

| | | | |
|---|---|---|---|
| 2,649,499 | 8/1953 | Barco et al. | 358/57 |
| 3,003,391 | 10/1961 | Land | 358/57 |
| 3,077,516 | 2/1963 | France | 358/64 |
| 3,271,512 | 9/1966 | Daw | 358/57 |
| 3,396,233 | 8/1968 | Kazan | 358/57 |
| 3,443,025 | 5/1969 | Gold | 358/57 |
| 4,025,164 | 5/1977 | Doriguzzi et al. | 350/160 LC |
| 4,068,926 | 1/1978 | Nakamura et al. | 350/160 LC |
| 4,097,128 | 6/1978 | Matsumoto et al. | 350/347 |
| 4,497,543 | 2/1985 | Aoki et al. | 350/337 |
| 4,652,087 | 3/1987 | Bos et al. | 350/338 |
| 4,758,818 | 7/1988 | Vatine | 340/784 |
| 4,917,465 | 4/1990 | Conner et al. | 350/335 |
| 4,966,441 | 10/1990 | Conner | 350/335 |

FOREIGN PATENT DOCUMENTS

| | | |
|---|---|---|
| 34-13 | 1/1959 | Japan . |
| 47-38271 | 9/1972 | Japan . |
| 48-32594 | 10/1973 | Japan . |
| 0024493 | 2/1977 | Japan ................................. 340/784 |
| 55-45036 | 3/1980 | Japan ................................ G02F 1/133 |
| 57-144590 | 9/1982 | Japan . |
| 60-486 | 1/1985 | Japan . |
| 60-76383 | 5/1985 | Japan . |
| 62-269929 | 5/1986 | Japan ................................ G02F 1/133 |
| 63-225323 | 9/1988 | Japan ................................ G02F 1/133 |
| WO88/02129 | 3/1988 | WIPO . |

OTHER PUBLICATIONS

"Liquid Crystals Their Physics, Chemistry and Application" London the Royal Society 1983.
"Flat–Pannel Displays Displace Large, Heavy, Power–Hungry CRTS" 1989, IEEE.
"Micro–Polarizer Arrays Applied to a New Class of Stereoscopic Imaging" Sadeg M. Faris 1991, SID, pp. 840–843.
"A–Si TFT Active–Matrix Full Color LC TV" Japan Display '83.

*Primary Examiner*—Kee M. Tung
*Assistant Examiner*—Doon Chow
*Attorney, Agent, or Firm*—Anthony Luke Simon

[57] ABSTRACT

An electronic display generates an image which, through substantial registry of two opponent vector images, is perceived as a full color image. The display receives two channels of information representing two opponent color vectors of an image to be displayed, develops two images in the two opponent color vectors, and superimposes the two images to generate the image which is perceived as a full color image.

26 Claims, 8 Drawing Sheets

_5,682,180_

MULTI-COLOR ELECTRONIC DISPLAY UTILIZING OPPONENT COLORS

This is a Continuation-In-Part application of previously filed U.S. patent application Ser. No. 07/366,091, filed Jun. 13, 1989 in the name of the same inventors as the present application and since abandoned.

This invention relates to electronic color displays, including CRTs and flat-panel color displays, and more particularly displays based on the opponent color vector phenomenon, including two-element scanned and matrix-addressable color displays.

BACKGROUND OF THE INVENTION

The generation of an apparently full-color image using two superimposed primary light projection sources was reported by Edwin Land in a series of scientific articles beginning in January, 1959 (see Color Vision and the Natural Image, Part I, *Proceedings of the National Academy of Sciences*, pages 115–129, January 1959; Color Vision and the Natural Image, Part II, *Proceedings of the National Academy of Sciences*, pages 636–644, April 1959; and Experiments in Color Vision, *Scientific American*, 200(5), pages 84–99, May 1959). The sources were created by exposing two black-and-white photographic films with a colorful scene through different color filters. One of the films (termed the long wavelength record) was exposed through a red filter, and the other film (termed the short wavelength record) was exposed through a green filter, the gray scale density of the records being approximately equal. To generate the image, the long wavelength record was projected through a red filter, and the short wavelength record was projected through a neutral density filter which matches the overall luminance range to that of the light coming through the red filter. Contrary to conventional color theory which would expect only whites, pinks, and reds, a wide range of the original scene hues were produced.

The copending patent application U.S. Ser. No. 306,123 to Troxell, filed Feb. 6, 1989, and assigned to the assignee of the present invention, discloses and claims a novel application of the Land phenomenon to a flat-panel matrix-addressable display by electronically generating two monochrome images in substantial registry. The resulting image is defined by an array of color elements, each such element being defined by a pair of monochrome pixels. If the pixels are sufficiently small, they are perceived as though superimposed, and a fairly wide range of color is perceived.

SUMMARY OF THE INVENTION

The present invention is directed to electronic color displays, including CRT displays and two-element matrix-addressable displays, based on the opponent color perception phenomenon. Recent research involving the characterization of primate color response data has resulted in the identification of specific visual components, referred to as opponent vectors, three of which account for approximately 93% of the data variance (see Young, Richard A., principal-component Analysis of Macaque Lateral Geniculate Nucleus Chromatic Data, *Journal of the Optical Society of America A*, Vol. 3, page 1735, October 1986).

The results of the opponent vector research are graphically depicted by the traces 12–16 of FIG. 1a, the trace 12 representing the primary black/white vector, the trace 14 representing the secondary orange/cyan vector where cyan is a bluish-green color, and the trace 16 representing the tertiary green/magenta vector where magenta is a reddish-blue color. The presence of one of the colors of any vector inhibits the perception of its opponent, or complement, color. Thus, black is not perceived in the presence of white in the same location, orange is not perceived in the presence of cyan, and so on.

The present invention is specifically directed to a method and apparatus of electronic color displays, including CRT and flat-panel matrix-addressable color displays, which generate color images through the substantial registry of the first two opponent vectors 12 and 14 depicted in FIG. 1. These two vectors (or any rotation of them) are optimal in that they account for the maximum amount of data variance explainable by just two vectors in the primate color vision system. The improvements accomplished by this invention over Land-type perceived color systems is the range of colors perceived. Implementing an opponent color scheme into an electronic display, this invention achieves a multi-color image with a wider variety of perceived colors than a Land-type system. Additionally, the color coordinate system implemented by this invention is an orthogonal one, greatly simplifying color calibration and aiding in the accurate transmission and truthful reproduction of color. Furthermore, all such two-channel displays have the advantage of lower cost and/or higher spatial resolution than conventional displays.

In the preferred embodiment of this invention, the display is defined by an array of color elements, each comprising the combination of two opponent color vector pixels, e.g., a black/white pixel and an orange/cyan pixel. The color of each such pixel is produced by a novel combination of known display elements, and is electronically controlled in accordance with previously determined and stored data, or from live video data, to produce a perceived multi-color image.

BRIEF DESCRIPTION OF THE DRAWINGS

The foregoing may be best understood by reference to the following description of the preferred embodiments and the drawings in which:

FIG. 12 is a schematic diagram for implementing the opponent color concept in a flat-panel display.

DETAILED DESCRIPTION OF THE INVENTION

Figure 1A:
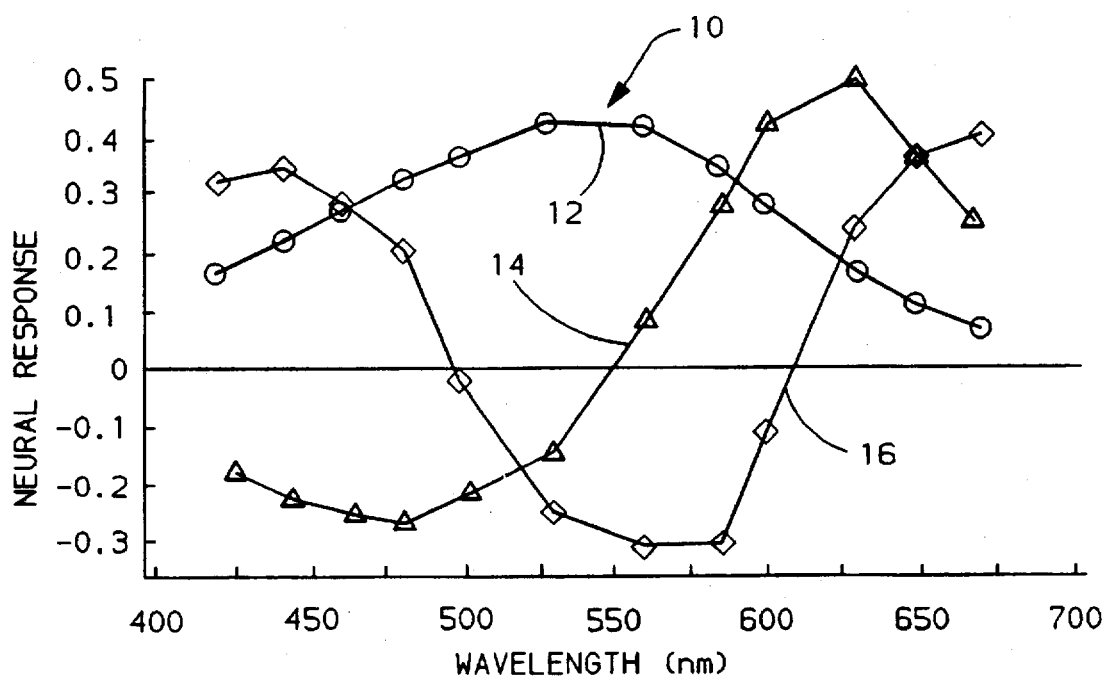
FIG. 1a is a graph of the first three principal chromatic components of the primary visual system.

Referring to FIG. 1a, reference number 10 generally designates a set of spectral response curves. The opponent vectors 12–16 were developed by applying an eigenvector analysis to a compilation of primate vision physiological data, as described in the Young (1986) article. The black/white vector 12 accounts for 59% of all color; it is loaded high with wavelength variables from the middle of the spectrum while loaded low with those at the spectral extremes. The orange/cyan vector 14 accounts for 28% of all color; it is loaded negatively by variables at short wavelengths and positively by variables at long wavelengths. Finally, the green/magenta vector 16 accounts for only 6% of the color; it is negative in the middle of the spectrum and positive at the extremes (the remaining 7% of the color variance is attributable to noise in the neural data).

Figure 1B:
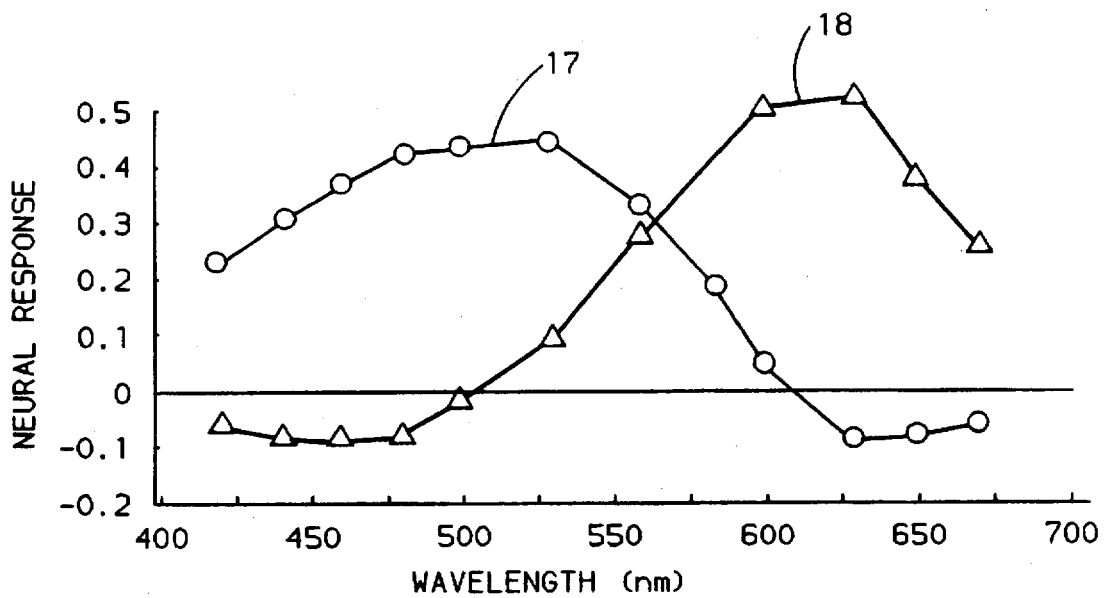
FIG. 1b is a graph of the first two principal chromatic components rotated to from green/reed and yellow/blue opponent color vectors.

It should be noted that the black/white and orange/cyan opponent color vectors are not the only two orthogonal opponent color vectors which, when used in a display, can account for 87% of all color perceived. Any rotation of the axes for the cell spectra plot as described in Young's (1986) article, supra, results in two opponent color vectors which serve equally well for representing and displaying color information in an optimal fashion. The result of one such rotation is depicted in FIG. 1b, a plot of two opponent color vectors, green/red 17 and yellow/blue 18, which together also account for 87% of all perceived colors. Each of the opponent color vectors 17 and 18 now account for approximately 43.5% of the perceived colors. It follows that the preferred implementation of this invention can use any two opponent color vectors which together account for the large majority of all color perceived. However, the proper opponent color vector pairs must be used together for optimum results. For example, the black/white vector must be used with the orange/cyan vector or the green/red vector must be used with the yellow/blue vector. For simplicity of explanation, the examples below are illustrated with reference to the orange/cyan and black/white opponent color vectors.

As described below, this invention utilizes electronic display devices, such as flat-panel matrix-addressable displays or CRTs, to generate first and second substantially superimposed opponent vector images corresponding to two principal opponent color vectors, e.g., the black/white and orange/cyan vectors defined by the traces 12 and 14 of FIG. 1a. The image as a whole is defined by an array of color elements, each comprising a black/white pixel and an orange/cyan pixel.

Figure 2:
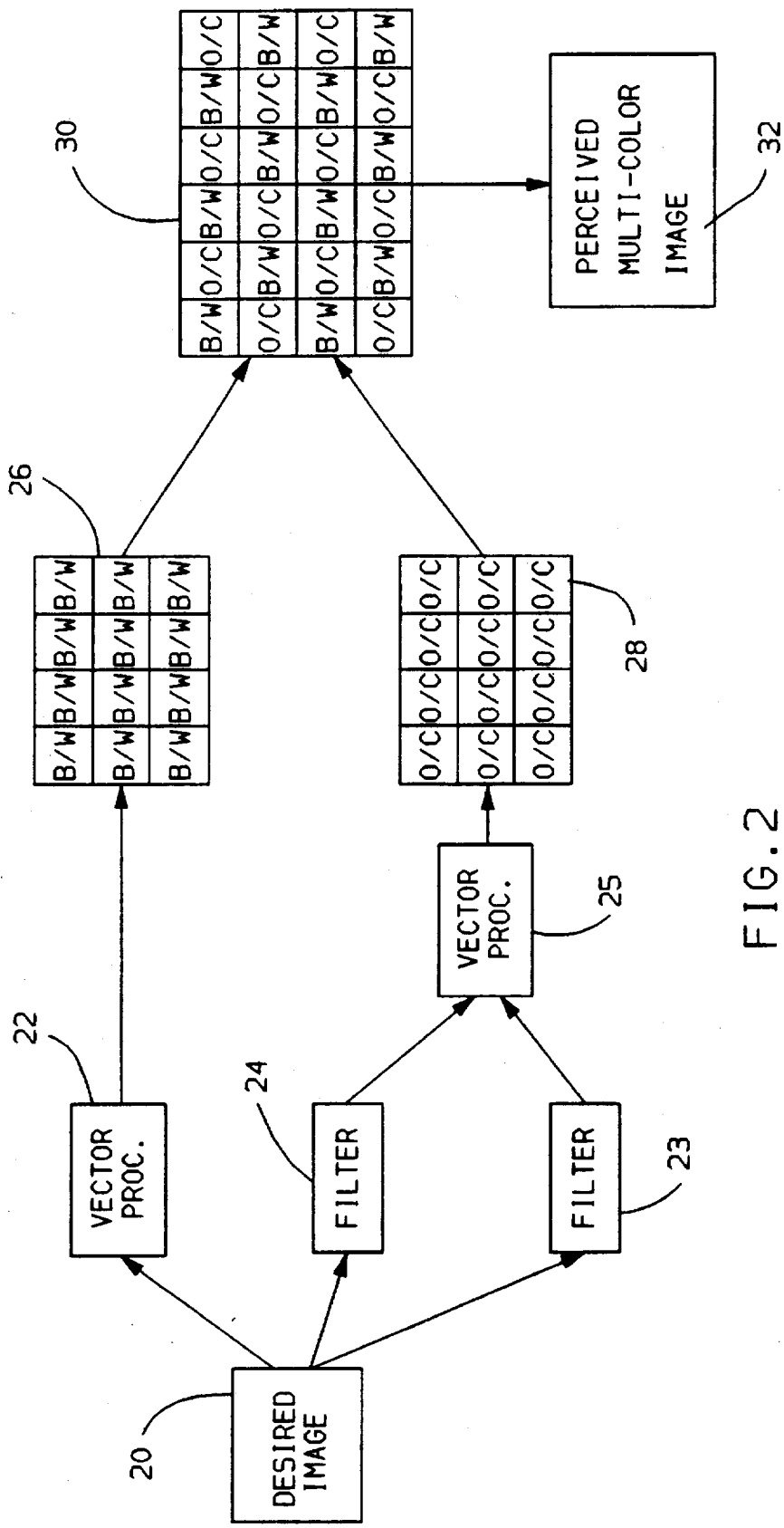
FIG. 2 is a schematic diagram for implementing the opponent color concept in an electronic display device.

The method of this invention can be understood with reference to FIG. 2. A desired image 20 to be reproduced is separated into two channels of information. This separation into two channels of information can be accomplished several ways. For example, the first channel may be processed through block 22 to be a black/white opponent color channel representing the overall luminous intensity image (a simple black and white image) of the desired image 20. The second channel is correspondingly filtered at boxes 23 and 24 into orange and cyan images. The orange and cyan images are then converted into electronic information and combined into an orange/cyan opponent color vector at box 25. A simple method of forming the orange/cyan vector is to subtract the electronic signal representing each pixel of the cyan image from the signal representing the corresponding pixel of the orange image. The resulting set of difference signals represents the orange/cyan opponent color vector.

It is preferable to develop the orange/cyan vector electronically as described above for the following reasons. The opponent color phenomenon is a function of how the eye processes color information, not of the light itself. The presence of certain wavelengths of light actually negates our perception of certain other wavelengths which may actually be present. This can be seen with reference to the orange/cyan vector 14 in FIG. 1a. The figure shows that the orange/cyan vector actually gives a negative neural response to shorter wavelengths of light. This response can be said to be a form of subtraction by the eye of one color of the opponent vector from the other color. For opponent color to be implemented in a display, as one color of the opponent vector is increased, the other must be decreased in a reciprocal fashion. Both colors are not turned fully on. By subtracting the orange 24 and cyan 23 components of each pixel of the image at box 25 in FIG. 2, the resultant vector signal can be represented as a single number at each pixel, and with this invention can be displayed so the eye can properly see the opponent color vector.

In contrast, if a projection from a slide containing an orange filtered image of an object is overlaid on a screen with a projection from a slide with a cyan filtered image, the image that the eye would see would not be an opponent color vector image, but an addition by the eye of the two images. The addition of the overlaid orange and cyan filtered images could appear white as well as orange or cyan, whereas an opponent image may appear gray, but never white. One important requirement for this invention is producing the vector images so that the colors of each vector can be properly subtracted by the eye. Several examples for such proper implementation are set forth below.

The orange/cyan opponent color channel 25 comprises a single number at each pixel of the orange/cyan vector image 28 of the desired image 20. The black/white channel 22 is also converted into electronic information. The two opponent color vector images 26 and 28 of the original image 20 can then be stored as electronic information or further processed. The two channels of information are then used to create one composite image 30, which is perceived as a substantially full color image 32. The individual checks in the checkerboard display are small enough so that the eye fuses the information in a manner reminiscent of mosaic-screen-plate color photography used for plates and films in early color photography (MacAdam, P. L., *Color Measurement, Theme and Variations*, 2d Ed., Springer-Verlag, Berlin, 1985, pp. 189–92).

The method of this invention is not limited to the above illustration. This invention also includes the creation of two channels of information by electronic data separation instead of filtering light and the use of the opponent color phenomenon with computer graphics. For example, the electronic data of a conventional video camera can readily be converted into the opponent color vectors. Conventional video cameras typically record three separate images of a scene, a red image, a green image, and a blue image, which represent traditional color theory images of the scene. The two separate opponent color vector information channels can be defined as follows. If each pixel of the red, green, and blue images represented by $R_i$, $G_i$, and $B_i$, respectively, then each pixel of the black/white vector can be defined as $(R_i+G_i+B_i)/3$. Each pixel of the orange/cyan vector can be approximated simply as $R_i-B_i$. A more accurate approximation for each pixel of the orange/cyan vector can be defined as $aR_i+bG_i+cB_i$, where a, b, and c are all constants, a being relatively large, b being relatively small, and c being negative. Specific values of a, b, and c can be easily developed by one skilled in the art through simple experimentation to produce the desired image quality.

Various implementations of the invention can be understood with reference to the below-described examples.

EXAMPLE 1

Figure 3:
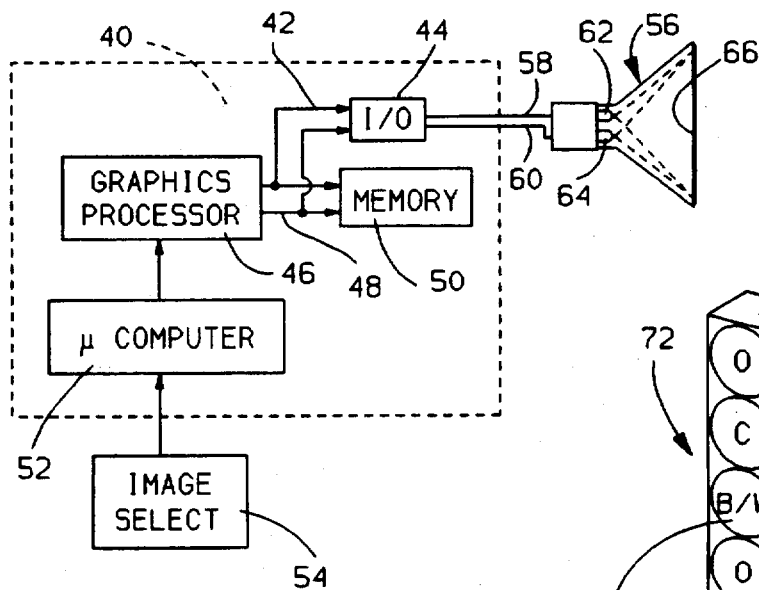
FIG. 3 is a schematic diagram for implementing the opponent color concept in a device incorporating a CRT.

Referring to FIG. 3, the opponent color phenomenon can be easily implemented into a CRT display while offering a more economical display because only two channels of information are needed to create a multi-color image. In FIG. 3 reference numeral 40 generally designates the driver electronics system for the CRT display 56. The driver system 40 includes a microcomputer 52 (or a digital signal processor) which interacts with a graphics processor 46. The microcomputer 52 and the graphics processor 46 interface in the normal manner with memory 50 and input output unit (I/O) 44 via address and data busses 42 and 48.

In general, the microcomputer 52 executes an operating program permanently stored in the memory 50. Memory 50 also provides a convenient data storage location where data may be temporarily stored and from which data may be read at various address locations determined in accordance with the operating program.

In the operation of the driver electronics for the CRT display 56 certain discrete input signals such as an image select 54 may be input to the microcomputer 52. In the preferred embodiment of this invention, the image select 54 processes the various opponent vector images. The processed image select information is applied to the I/O unit 44 which outputs, through lines 58 and 60, control signals for controlling the vertical and horizontal sweep of the electron guns 62 and 64, exciting orange, cyan, and white phosphors on an inner surface 66 of CRT 56.

The first channel opponent color vector information is output through line 58 and controls the sweep and intensity of electron gun 62 to excite the white phosphors, creating a black/white image. The second channel opponent color vector information is output through line 60 and controls the sweep and intensity of electron gun 64 to excite the orange- and cyan phosphors, creating an orange/cyan image superimposed in a matrix-fashion on the black/white image. In this manner, a final image, perceived as multi-color, is produced.

The driver electronics depicted in FIG. 3 may be any of a variety of suitable electronics, programmable to perform the above described functions and are easily implemented by anyone of ordinary skill in the art.

Figure 4:
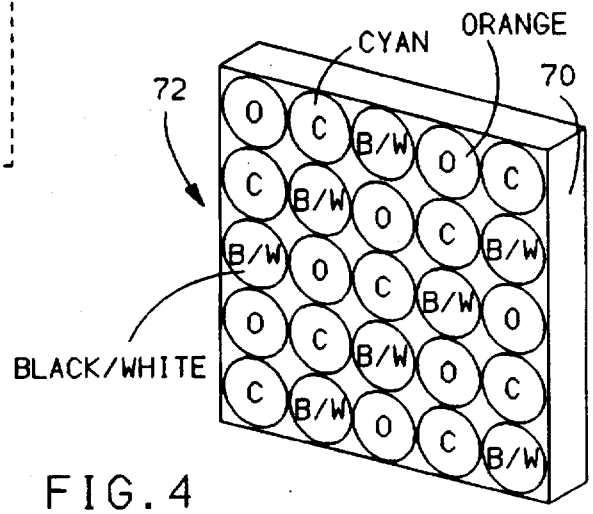
FIG. 4 is a diagram showing one example of phosphor distribution for a CRT implementing the opponent color concept.

FIG. 4 illustrates one example for the phosphor pattern on the inner surface of the CRT. Reference numeral 72 generally designates the phosphor pattern on the clear sheet 70. The phosphors alternate between the orange, cyan and white phosphors. Black is obtained by a white phosphor not in a state of excitement. The white phosphor could be an ordinary P-4 phosphor as used in black and white televisions. The cyan and orange phosphors could easily be made by mixing, in the proper ratios, the component phosphors that makeup the P-4 phosphor. For example, the cyan phosphor could be made from ZnS:Ag (blue, Sylvania GTE Type 1758B phosphor) with a small amount of (Zn,Cd)S:Cu:Al (green, Sylvania GTE Type 1758G phosphors). The orange phosphor could be made from, for example, the proper balance between the red and green forms of (Zn, Cd)S:Cu:Al (Sylvania GTE Types 1758G and 1758R phosphors). For the rotated vectors, the yellow and blue phosphors could be made from, for example, (Zn,Cd)S:Ag (yellow, Sylvania GTE Type 1738 phosphor), and ZnS:Ag (blue, Sylvania GTE Type 1758B phosphor); the red and green phosphors from (Zn,Cd)S:Cu:Al (Sylvania GTE types 1758G and 1758R phosphors). It should be recognized by those skilled in the art that the above phosphor examples are not limiting to the present invention.

In obtaining the opponent color vector out of the orange and cyan phosphors, the total luminance of each orange and cyan phosphor pair is kept constant with the apportionment of the luminance of each phosphor in each pair being varied. The total luminance for all the orange/cyan phosphor pairs may be lowered or raised, however, for purposes of picture brightness, if needed. One method to keep the luminance constant is to have the signal representing each orange/cyan phosphor pair represent the difference (or an amplified difference) of the luminance of each phosphor. As the electron gun sweeps across the phosphor pair, it excites each phosphor in the pair at a voltage level according to the luminance difference, with the total voltage used to excite each phosphor pair at a constant. If the difference is positive, then the orange phosphor is relatively more excited, and if the difference is negative, the cyan phosphor is negative, the cyan phosphor is relatively more excited. Conventional shadow-masks as are usual and customary for those skilled in the state of the art can be used to maintain proper color selection.

EXAMPLE 2

The use of the opponent color phenomenon with CRTs need not appear exactly as in the above two-gun example. The CRT may also be a single gun CRT where the single gun scans over all the phosphors on surface 66 in FIG. 3 and selects between the two channels of information, corresponding to whichever phosphor is required to be excited.

EXAMPLE 3

Figure 5:
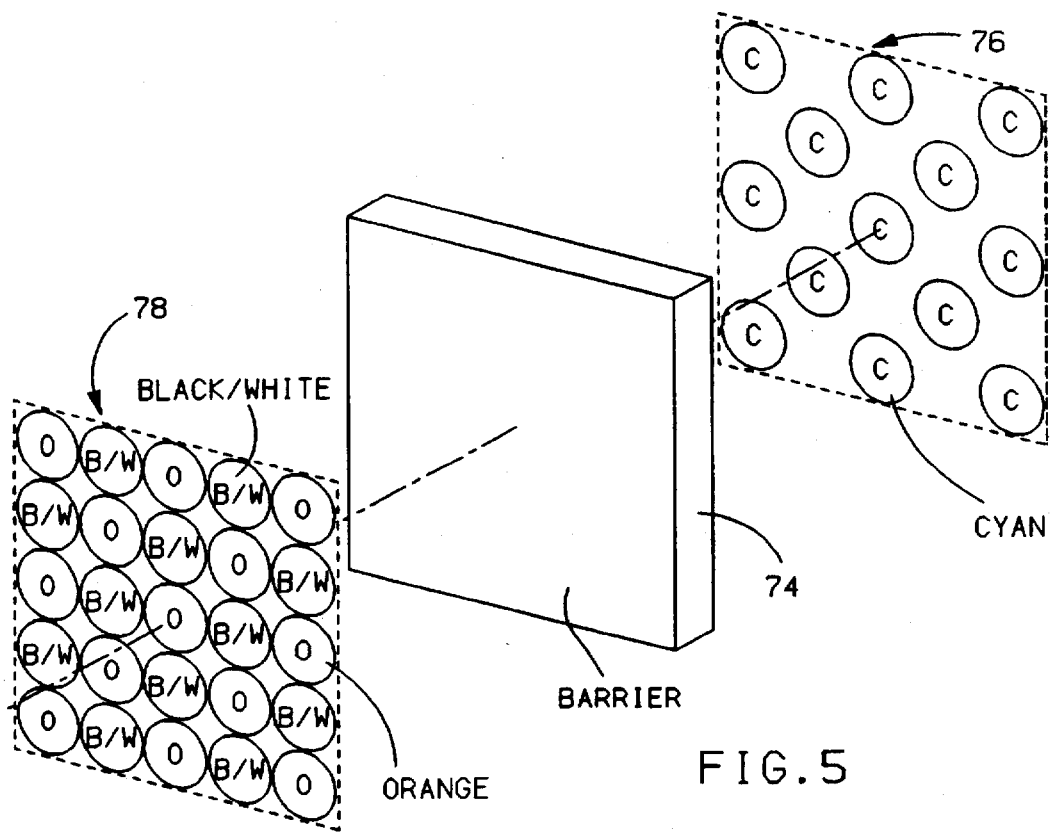
FIG. 5 is a schematic diagram showing phosphor distribution for a beam penetration CRT implementing the opponent color concept.

Referring to FIG. 5, the use of the opponent color phenomenon in CRTs that use beam penetration can achieve improved spatial resolution. In the exploded view, reference numeral 78 generally designates the orange and white phosphors which are placed on the surface of barrier 74 closest to the electron source. On the opposite surface of the barrier 74, cyan phosphors 76 are placed exactly opposite orange phosphors.

The white phosphors are excited as normal. The orange phosphors are excited by an electron gun set at a first voltage, and the cyan phosphors are excited by the same electron gun set at a higher voltage, capable of penetrating barrier 74. To obtain the orange/cyan color vector for a desired image, the total time the electron gun spends on any orange/cyan phosphor pair is constant and the ratio of the time each phosphor in each pair is excited corresponds to the desired ratio of their individual luminous intensities. A suitable barrier 74 can easily be implemented by one skilled in the art of beam penetration CRTs and may comprise, for example, a zinc sulfide layer sandwiched between two silicon dioxide layers.

Improved resolution is obtained from this implementation because, even though there are three phosphors per color element, the orange and cyan phosphors are stacked, resulting in the higher spatial resolution of a two phosphor per color element system.

EXAMPLE 4

Figure 6:
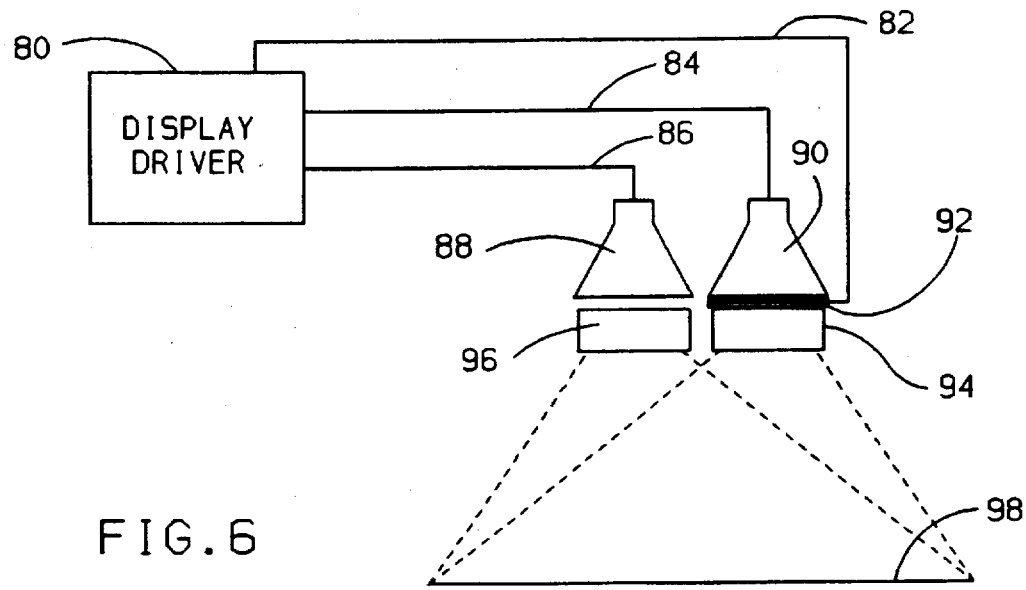
FIG. 6 is a schematic diagram for implementing the opponent color concept into a projection-type CRT display.

The present invention can also be implemented in a projection-type electronic display. Referring to FIG. 6, a multi-color image can be obtained using two projection sources, here CRTs 88 and 90, to project two images onto a screen so that the two images are superimposed. The first image is in the black/white color vector and the second image is in the orange/cyan color vector.

In the figure, the electronic control module 80 includes controls of the type normally used to drive projection CRTs. The first channel of opponent color vector information is output to the CRT 80 through line 86. The projection CRT 80 projects a black/white image, focused through lens 96, onto the projection surface 98. In this implementation, the second projection CRT 90 is used as a white light source and, controlled through line 84, projects substantially white light. Matrix-addressable dichroic filter 92, controlled through line 82, filters the substantially white light between orange and cyan to obtain the orange/cyan vector. The driver for the matrix-addressable display is similar to the matrix-addressable display driver explained below.

The combination of the second projection CRT 90 and the matrix-addressable dichroic filter 92 projects an orange/cyan image, focused through lens 94, onto the projection surface 98. The orange/cyan image is superimposed on the black/white image so that the single combined perceived image is a multi-color image containing perceived colors not found in the orange/cyan color vector alone.

Figure 7:
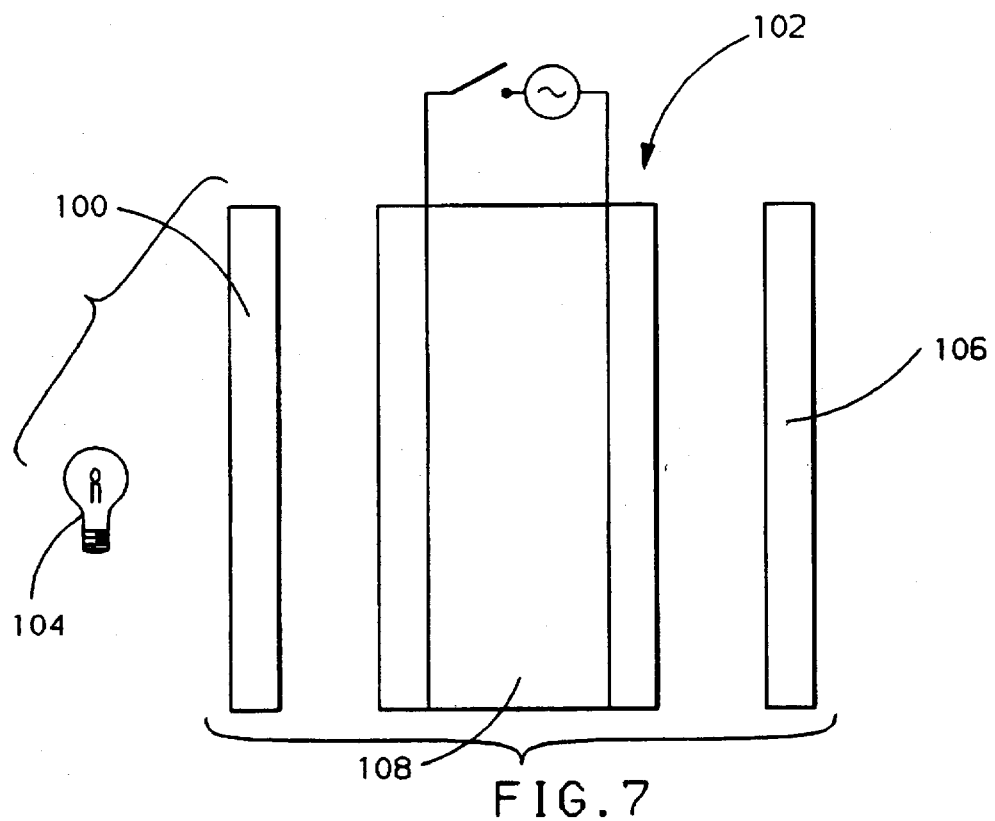
FIG. 7 is a schematic diagram showing a twisted nematic cell between two polarizers.
Figure 8:
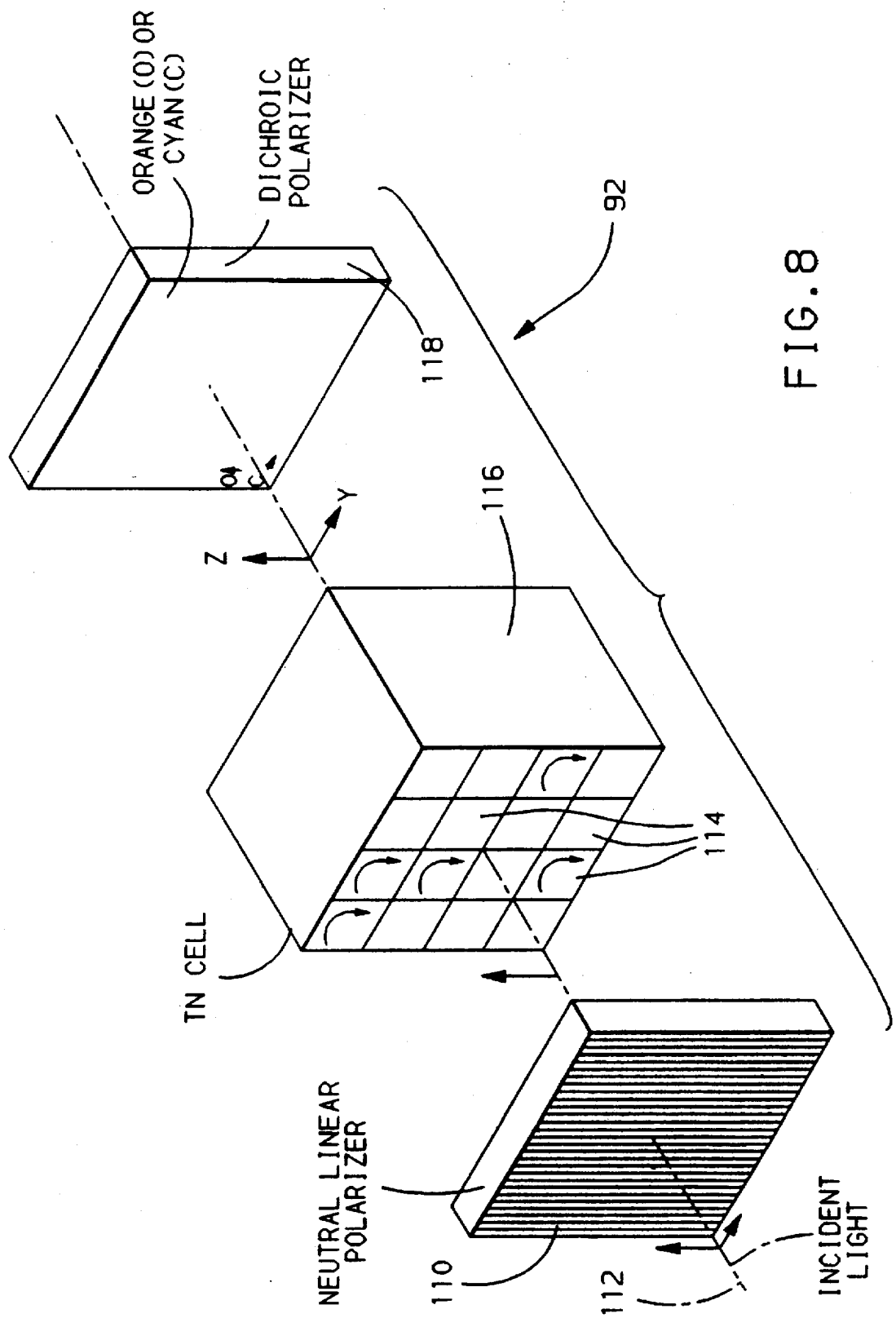
FIG. 8 is a schematic diagram for a dichroic filter for use with the projection-type CRT display FIG. 6.

The matrix-addressable dichroic filter can be understood with reference to FIGS. 7 and 8. Referring to FIG. 7, reference number 102 generally designates an operating principle for a light switching device which involves a twisted nematic (TN) liquid crystal cell. Between light source 104 and the front of the TN cell 108 is placed a neutral density polarizer 100, capable of producing linearly polarized light at all visible wavelengths. An identical second polarizer 106 is placed behind the TN cell, but with its polarization direction at right angles to that of the first polarizer. The polarizers are thus said to be crossed in this configuration. The twisted nematic cell 108 rotates the direction of polarization of light by 90 degrees when no voltage is applied and by zero degrees when voltage is applied, thus allowing the system to switch between a light transmitting (white) and a light blocking (black) state. The combination of crossed neutral density polarizers and the TN cell thus produces either a white or a dark transmitting state (white/black).

If either (but not both) of the two neutral polarizers 100 and 106 (say 106 which is behind the TN cell) is replaced by a single color dichroic polarizer, the system now switches light between a white light state and a colored light state. Whether the colored or white state is produced when voltage is applied depends on the relative orientation of the polarization axes of the two polarizers. If instead one of the two neutral polarizers is replaced by a pair of different colored dichroic polarizers (e.g., orange and cyan) which are crossed with respect to one another, the total system can be made to switch between the two colors in going from a voltage-off to a voltage-on state. Again, which color corresponds to the voltage-on state depends on the polarizer axes directions. For instance, if either polarizer 100 or polarizer 106 (but not both) is replaced with a crossed cyan/orange dichroic polarizer pair, switching the voltage on and off switches light between cyan and orange, depending on the orientation of the dichroic polarizer axes with respect to the axis of the neutral polarizer. The operating principle of the combination of the dichroic pair with the neutral density polarizer is that when the dichroic polarizer axis is rotated 90 degrees with respect to that of the neutral polarizer, the light transmitted by the combination switches between cyan and orange. Placing a twisted nematic cell 108 between the neutral density and dichroic polarizers allows the color switching to occur electronically.

Referring to FIG. 8, reference number 92 generally designates a method for implementing the opponent color concept in a device incorporating a neutral density polarizer 110, a multi-pixel twisted nematic matrix 116, a dichroic polarizer 118, and an incident light source 112 (e.g., CRT 90 in FIG. 6).

In one embodiment of this invention, the neutral density polarizer 110 is used to produce linear polarization in an up and down (Z-axis) direction. When light from incident light source 112 passes through the neutral density polarizer 110, all the light transmitted through the neutral density polarizer 110 is polarized in the Z-axis direction. This light then passes through the TN cell 116, which is composed of a number of electronically adjustable pixels 114. Each of the pixels 114 can be separately addressed to rotate the plane of polarization of light by 90 degrees or not rotate it. In FIG. 8, random pixels adjusted to rotate light polarization (by application of zero voltage) are indicated with an arrow showing the direction of rotation. When Z-axis light passes through the upper left-hand pixel in the TN cell 116, that transmitted light is rotated 90 degrees clockwise, ending up in a Y-axis direction, prior to passing through the polarizer 118. However, when light from the neutral linear polarizer 110 passes through the upper right-hand pixel in TN cell 116, the light is not rotated and passes through in a Z-axis direction, before continuing through the polarizer 118.

When light polarized in the Z-axis direction passes through the dichroic polarizer 118, it is filtered to be orange. When light polarized in the Y-axis direction passes through the dichroic polarizer 118, it is filtered to be cyan. When light polarized between the Y and the Z-axes directions passes through the dichroic polarizer 118, the light is filtered to be a combination of orange and cyan, the proportion of each color depending upon the angle of polarization.

To filter the light as required to project properly the orange/cyan image in FIG. 6, voltage is applied selectively to each pixel of the TN cell 116. In response to the voltage, each pixel orients the polarization of the light to obtain the required orange/cyan vector for the particular image pixel as indicated by the orange/cyan opponent color vector information channel 28 (FIG. 2).

This invention is not limited to the use of TN cells to change the polarization of light, but includes any cell capable of changing or rotating the polarization of light in response to electrical signals (e.g., supertwist, Pockell, Kerr, and ferroelectric cells).

EXAMPLE 5

Figure 9:
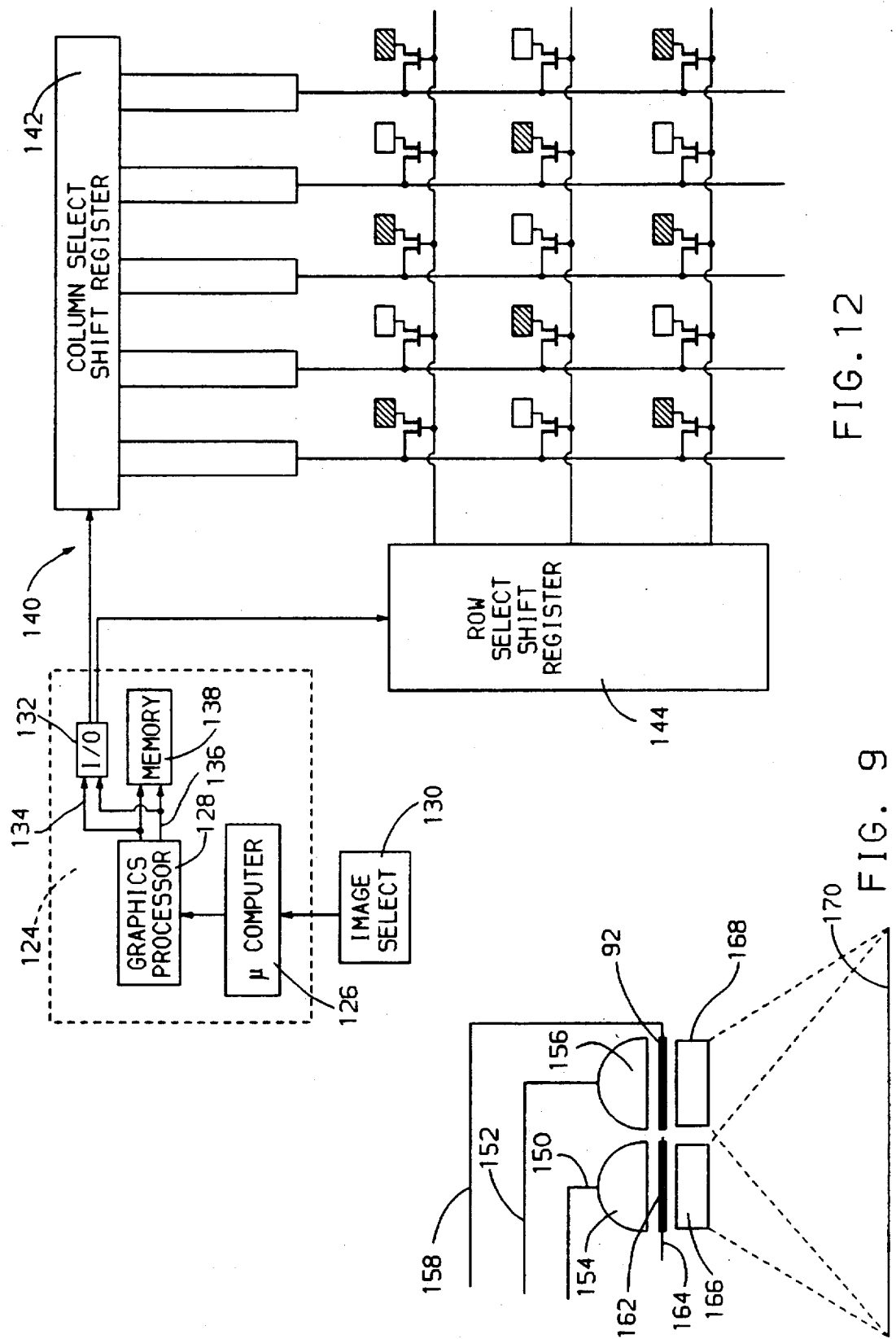
FIG. 9 is a schematic diagram for a projection display using two flat-panel matrix-addressable filters.

The present invention can also be implemented into a projection system which does not use CRTs. Referring to FIG. 9, two white light sources 154 and 156, powered by lines 150 and 152, supply white light for projection purposes. The white light from source 156 is filtered by the flat-panel dichroic matrix-addressable filter 92, which may be identical to the filter described above with reference to FIG. 8, into an orange/cyan vector image. The control signals to the filter are sent through control cable 158. After the light is filtered by filter 92, it is focused by lens 168 and projected onto projection surface 170, as the orange/cyan vector image of the desired image.

The white light from white light source 154 is filtered by flat-panel matrix-addressable filter 162. The filter 162, controlled by cable 164, develops a black/white vector image of the desired image. To obtain the black/white vector, the filter 162 may be similar to the filter described above with reference to FIG. 8, except that dichroic polarizer 118 (FIG. 8) is replaced by a neutral density polarizer similar to polarizer 110 (FIG. 8), with the direction of polarization perpendicular to the direction of polarization of polarizer 110.

The black/white vector image is focused through lens 166 and projected onto projection surface 170 so that it is superimposed over the orange/cyan image. Together the two superimposed images produce a seemingly full color image.

EXAMPLE 6

Figure 10:
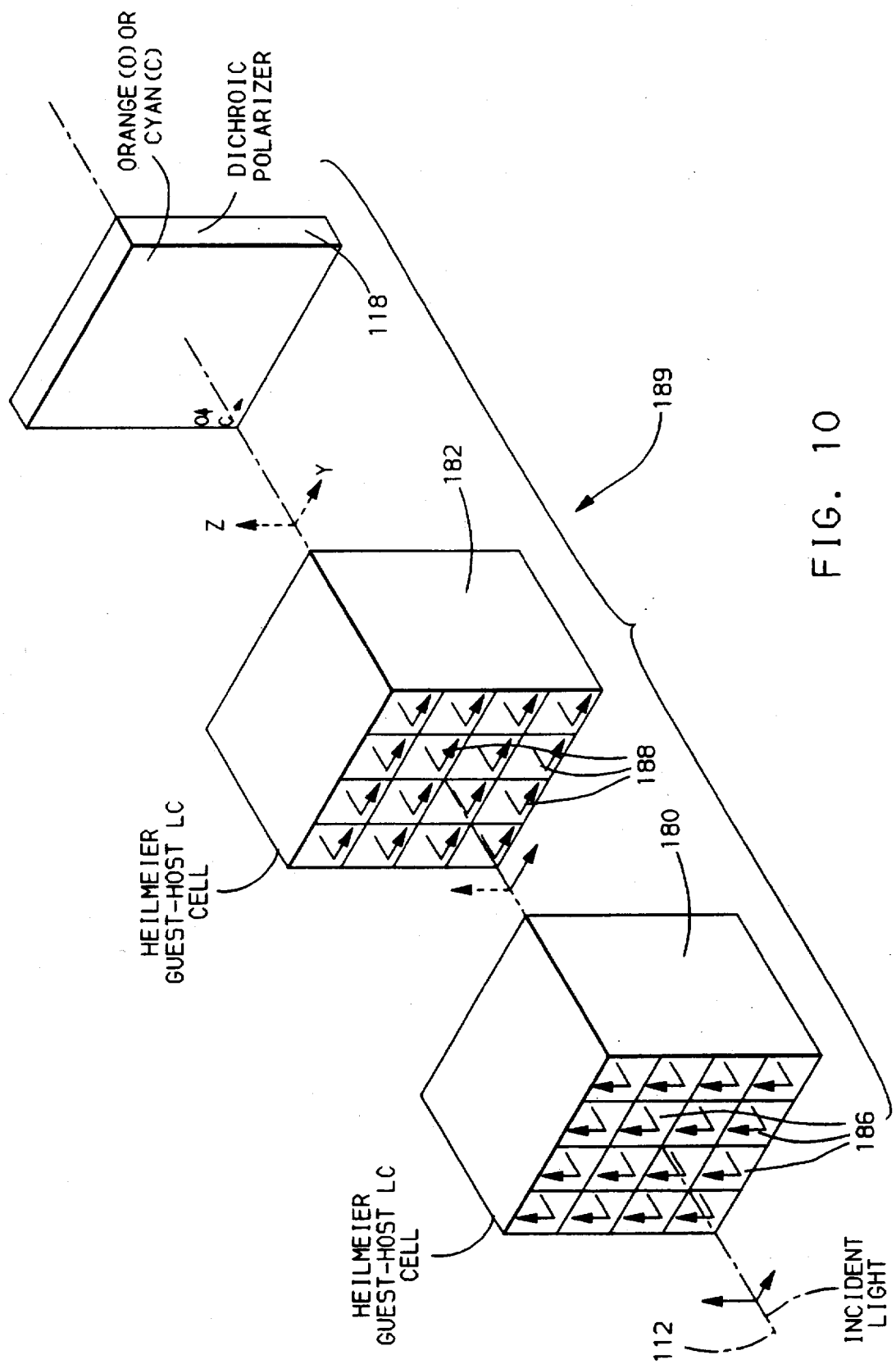
FIG. 10 is a schematic diagram for a dichroic filter for use in a projection display to achieve the orange/cyan vector and black.

An improvement on the above filter can be made to obtain not only the orange/cyan vector, but black as well. With the filter as described with reference to FIG. 8, the systems in FIGS. 6 and 9 cannot obtain a completely black screen. Even if CRT 88 (FIG. 6) is projecting a black image, or filter 162 (FIG. 9) is blocking all of the light from source 154, the filter 92 (FIGS. 6 and 9) still passes light onto the projection surface 98 (and 170). If this is undesirable, filter 92 can be replaced by filter 189 in FIG. 10.

Filter 189 is constructed with two Heilmeier guest-host liquid crystal cells 180 and 182 and dichroic polarizer 118 as shown. Both of the guest-host cells 180 and 182 are matrix-addressable with separately addressable pixels 186 and 188. The first guest-host cell 180 is rubbed so the guest dye molecules prevent the transmission of light polarized in the Z-axis direction when zero voltage is applied. The resulting passing light is polarized in the Y-axis direction. When voltage, V, is applied to a pixel 186, all of the light is transmitted through that pixel. The second guest-host cell 182 is rubbed so the guest dye molecules prevent the transmission of light polarized in the Y-axis direction when zero voltage is applied. Like the pixels 186, when voltage, V, is applied to a pixel 188, all of the light is transmitted through that pixel.

In operation of the filter 189, if zero voltage is applied to corresponding pixels of each of the cells 180 and 182, then light does not pass through the pixels. If a voltage, V, is applied to corresponding pixels in guest-host cells 180 and 182, then light passes through the corresponding pixels and is not polarized. The light then passes through a corresponding portion of the dichroic polarizer 118 and is filtered into orange/cyan light. If a pixel 186 of guest-host cell 180 has zero voltage applied, and the corresponding pixel 188 of cell 182 has voltage, V, applied, then the corresponding light striking the polarizer 118 is polarized in the Y-axis direction and, upon passing through the dichroic polarizer 118, is filtered cyan. If a pixel 186 of guest host cell 180 has a voltage, V, applied and a corresponding pixel 188 of cell 182 has zero voltage applied, then the light striking the polarizer 118 is polarized in the Z-axis direction and, upon passing through the dichroic polarizer 118, is filtered orange. If a voltage less than V but greater than zero is applied to a pixel 186 or 188, then the light through that pixel is partially polarized.

To obtain the orange/cyan vector, the total light passage through each corresponding pixel 186 and 188 is kept constant, with the apportionment of the polarization of the light being varied. One method of keeping the intensity constant is to have the signal representing each orange/cyan phosphor pair represent the difference (or an amplified difference) of the desired intensities of the two colors of the vector. As each corresponding pixel pair 186 and 188 is addressed, it polarizes, through applied voltages, each Y and Z axis of the passing light according to the intensity difference, with the total voltage used to drive each corresponding pixel pair at a constant. Thus the two guest-host cells 180 and 182 are driven from a single channel of information. The signals representing black in the desired image apply zero volts to both corresponding pixels 186 and 188.

Since the filter 189 obtains both the orange/cyan opponent color vector and black, higher luminance contrast images can be produced using filter 189 in place of filter 92. However, filter 189 requires the use of two matrix addressable cells whereas the filter 92 requires the use of only one.

EXAMPLE 7

Referring again to FIG. 6, the projection-type electronic display implementing the opponent color phenomenon need not include the matrix-addressable dichroic filter 92. Instead, the second projection CRT 90 may itself project orange and cyan light according to the second opponent color vector information channel which is output from the electronic controller 80 through line 84. The orange/cyan image is projected on the projection surface as above, resulting in a multi-color image.

It shall be understood that the use of CRTs in conjunction with the above described examples can be easily implemented by one skilled in the art.

EXAMPLE 8

Figure 11:
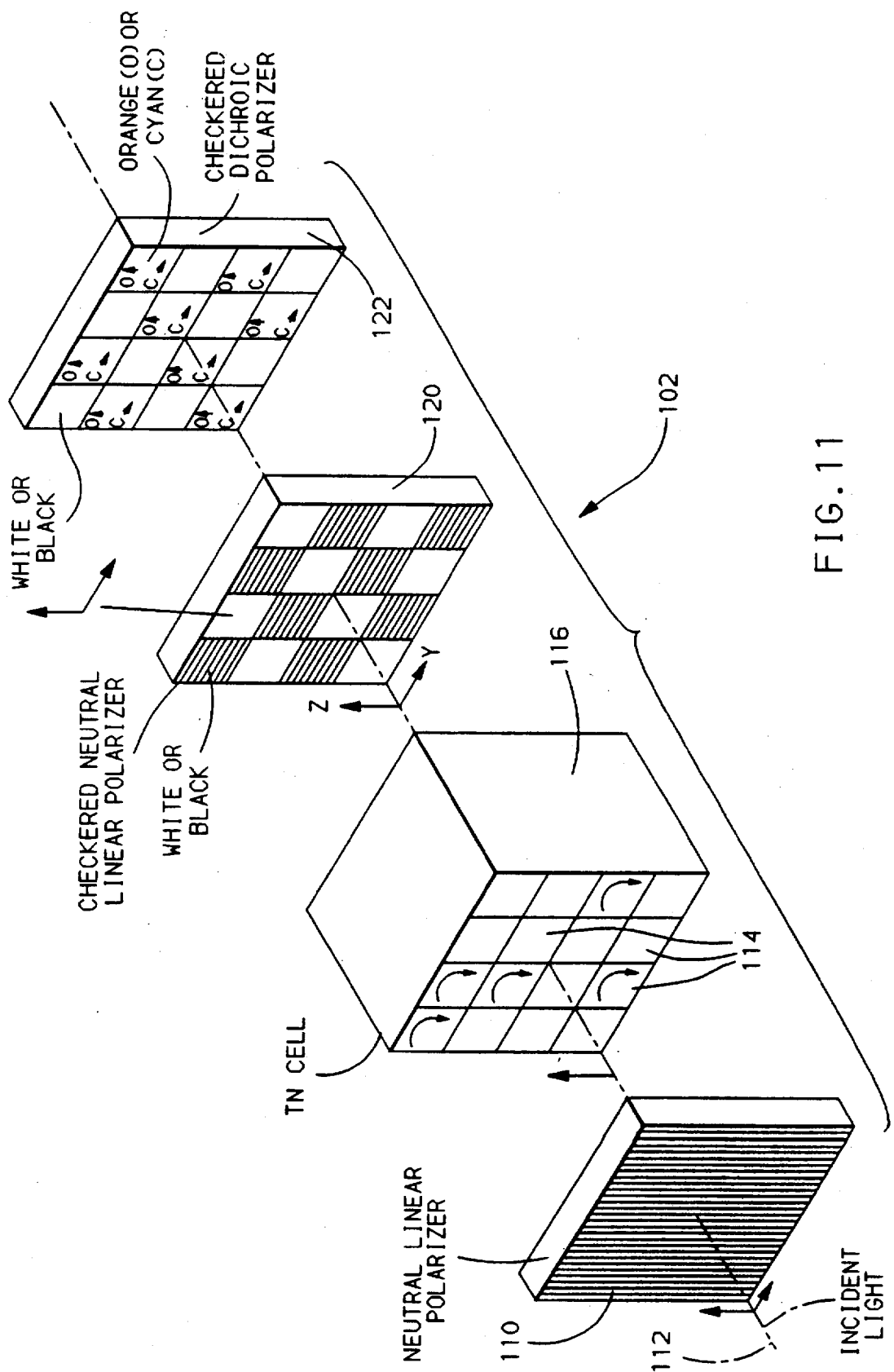
FIG. 11 is a schematic diagram for implementing the opponent color concept in a device incorporating a neutral density polarizer, a multi-pixel twisted nematic matrix, and a patterned neutral density/patterned dichroic polarizer combination.

The present invention includes the use of the opponent color phenomenon in flat-panel displays. To generate the superimposed images, the display of this invention utilizes a novel combination of a TN LCD and a pair of matrixed polarizers. Referring to FIG. 11, reference number 102 generally designates a method for implementing the opponent color concept in a device incorporating a neutral density polarizer 110, a multi-pixel twisted nematic liquid crystal matrix 116, a unique polarizer pair combination consisting of a checkered neutral density polarizer 120 and a checkered dichroic polarizer 122, and an incident light source 112.

The neutral density polarizer 110 and the TN cell 116 operate as described above. The polarizer pair combination in the figure consists of two checkered polarizers, one a neutral density polarizer 120 and the other a similarly patterned dichroic pair polarizer 122. Each checkered polarizer 120 and 122 consists of polarizing elements and clear, non-polarizing elements (indicated by blank squares). Such a pattern may be produced by selective bleaching using a mask and ultraviolet irradiation or by any other suitable process. In the final assembly of the patterned polarizer combination 120 and 122, the non-polarizing elements of the dichroic polarizer 122 are superimposed on the polarizing elements of the neutral density checkered polarizer 120, and conversely. In turn, the polarizer pair elements are superimposed over the pixels 114 of the TN cell 116. By properly adjusting the voltage applied to the twisted nematic pixels 114 to rotate or not to rotate the light polarization, as required, it is then possible to produce almost full-color images by the opponent color scheme.

To illustrate how this works in practice, refer again to FIG. 11. Light from incident light source 112 enters the neutral linear polarizer 110 which aligns the light polarization along the Z-axis. When this polarized light enters the upper left-hand pixel of TN cell 116, the light polarization is rotated 90 degrees to a Y-axis direction since no voltage is applied to the pixel. The Y-polarized light now enters the polarizing element in the upper left-hand corner of the checkered neutral polarizer 120. Since the polarization direction of the light has been rotated to coincide with the polarization direction of this polarizing element, white light is transmitted. This white light is then transmitted through the non-polarizing element in the upper left-hand corner of the checkered dichroic polarizer 122. Since the non-polarizing element has no effect on the light being transmitted, the final transmitted light is white. If voltage were applied to a pixel in the TN cell 116, that element would not rotate light polarization and no light would be transmitted. This is the case for the pixel located at row 1, column 3 of the TN cell 116, where no light is transmitted.

As another example, consider the light transmitted through the upper right-hand pixel of the TN cell 116. That light polarization is not rotated so it remains in the direction of the Z-axis. There is no polarizing effect when the light passes through the non-polarizing element in the upper right-hand corner of checkered neutral linear polarizer 120, so the light remains in a Z-axis direction. Hence, when the light is transmitted through the upper right-hand orange/cyan element of checkered dichroic polarizer 122, the transmitted light is orange, since the orange component polarization axis is in the z-axis direction. These superimposed light projections result in the generation of an apparently full color image.

A pattern other than checkerboard could be used for the polarizing elements of the combined neutral density/dichroic pair 120 and 122. For instance, alternating neutral density and dichroic stripes, either vertical or horizontal, could be used. Consequently, with the appropriate groupings of patterns and rotations, either white/black or orange/cyan colors can be produced. This is true for any pair of color combinations, where the pair is chosen in accord with the opponent color scheme.

It will be recognized by one skilled in the art that the twisted nematic cell can be replaced by any liquid crystal cell capable of rotating the plane of light polarization (e.g., by a super-twist cell or any other cell employing liquid crystal molecules in such a configuration that they can rotate light polarization by some angle other than 90 degrees). Other cells appropriate for electric field control of light polarization direction include a Pockels effect cell which is a crystal lacking inversion symmetry and allowing electric field control of light polarization direction, a Kerr cell which allows electric field control of the index of refraction of material, and a Ferroelectric cell. The teachings and claims of this patent thus should not be restricted solely to use of a TN cell, but are understood to include any other suitable configuration.

A circuit for driving the TN cell 116 can be better understood with reference to FIG. 12. In the figure, reference numeral 26 generally designates the driver electronics for the matrix addressable display 102 shown in FIG. 11. Reference numeral 124 designates a graphics processor system which stores the individual opponent color vector images 26 and 28 (FIG. 1) of the desired color image 20 (FIG. 1). The graphics processor system 124 includes a microcomputer (or digital signal processor) 126 which interacts with a graphics processor 128. The microcomputer 126 and the graphics processor 128 interface in the normal manner with memory 138 and input output unit (I/O) 132 via address and data busses 134 and 136.

In general, the graphics processor system operates in a manner similar to the driver electronics system 40 in FIG. 3). However, the I/O unit 132 outputs control signals for controlling the column select shift register 142 and the row select shift register 144, to control the matrix-addressable cell 116. In this manner, a final image, perceived as multi-color, is produced.

The driver electronics depicted in FIG. 12 may be any of a variety of suitable electronics programmable by anyone of ordinary skill in the art.

The above examples are not meant to limit the scope of the present invention but, rather, are illustrative implementations of the invention, whose scope includes the implementation of the opponent color phenomenon with electronic displays to obtain multi-color images. Various other improvements and modifications of the present invention may occur to those skilled in the art and will fall within the scope of the claims below.

The embodiments of the invention in which an exclusive property or privilege is claimed are defined as follows:

1. An improved method for producing color images with electronic display devices, comprising:
   developing a first channel of electronic information representing a first opponent color vector of an image to be displayed;
   developing a second channel of electronic information representing a second opponent color vector of an image to be displayed;
   creating, from the first channel of electronic information, a first image in the first opponent color vector;
   creating, from the second channel of electronic information, a second image in a second opponent color vector; and
   superimposing the first and second images whereby the two superimposed images appear to an observer as a multi-color image, capable of giving rise to perceived colors not found in one of the opponent color vectors alone.

2. The method in claim 1 wherein the first opponent color vector is a black/white opponent color vector and the second opponent color vector is an orange/cyan opponent color vector.

3. The method in claim 1 wherein the first opponent color vector is a red/green opponent color vector and the second opponent color vector is a yellow/blue opponent color vector.

4. An electronic display device for producing multi-color images, comprising:
   means for receiving first and second channels of electronic information representing first and second opponent color vectors of an image to be displayed;
   means for developing, from the first and second channels of electronic information, first and second images in the first and second opponent color vectors; and
   means for superimposing the first and second images whereby the two superimposed images use opponent colors to appear to an observer as a single multi-color image, capable of giving rise to perceived colors not found in one of the opponent color vectors alone.

5. The apparatus in claim 4 wherein the first opponent color vector is a black/white opponent color vector and the second opponent color vector is an orange/cyan opponent color vector.

6. The apparatus in claim 4 wherein the first opponent color vector is a red/green opponent color vector and the second opponent color vector is a blue/yellow opponent color vector.

7. The device in claim 4, wherein the developing and superimposing means include:
- a CRT including an inner surface coated with a plurality of phosphor elements capable of emitting first, second and third colors of light, and spaced in groupings of three, each grouping containing phosphor elements capable of emitting the first, second and third colors and comprising a picture element, the first color being substantially white, the second and third colors comprising the second opponent color vector, each phosphor element having an individual luminous intensity, and each pair of the second and third phosphor elements within each picture element having a combined luminous intensity; and
- electronic control means for exciting the white phosphor elements, in response to the first channel of electronic information, creating the first image in the first opponent color vector, and for exciting the second and third phosphor elements, in response to the second channel of electronic information, creating the second image in the second opponent color vector superimposed on the first image.

8. The device in claim 7 wherein the second and third colors are orange and cyan.

9. The device in claim 7 wherein the electronic control means:
- develops from the second channel of information a signal representative of a desired combined luminous intensity of the second and third color phosphor elements for each picture element;
- develops a signal representative of a desired difference ratio of the individual luminous intensities of the second and third color phosphor elements for each picture element; and
- excites the second and third phosphor elements in response to the desired combined luminous intensity signal and the desired difference signal so that their combined luminous intensity is the desired combined luminous intensity and the difference of their individual luminous intensities is the desired ratio.

10. The device in claim 7 wherein only one of the second and third color phosphor elements is excited at one time.

11. The device in claim 4 wherein the developing and superimposing means include:
- a CRT including a first inner surface coated alternately with first and second phosphor elements capable of emitting first and second colors of light, a second inner surface coated with a plurality of third phosphor elements capable of emitting a third color of light, the first color being substantially white, the second and third colors comprising the second opponent color vector, and a barrier layer between the first and second inner surfaces; and
- electronic control means for exciting the white phosphor elements, in response to the first channel of electronic information, creating the first image in the first opponent color vector, and for exciting the second and third color phosphor elements, in response to the second channel of electronic information, creating the second image in the second opponent color vector superimposed on the first image.

12. The device in claim 11 wherein the second and third colors are orange and cyan.

13. The device in claim 4 wherein the developing and superimposing means include:
- first and second substantially white light sources;
- first means for filtering the substantially white light from the first light source, including two neutral density polarizers, and an electro-optic device composed of electronically addressable pixels and capable of rotating the direction of light polarization, so that the first light source in combination with the filter means project the first image in the first opponent color vector;
- second means for filtering the substantially white light from the second light source, including a dichroic polarizer, a neutral density polarizer, and an electro-optic device composed of electronically addressable pixels and capable of rotating the direction of light polarization, so that the second light source in combination with the second filter means project the second image in the second opponent color vector; and
- means for focusing the first and second images onto a projection surface so that the images are superimposed, producing a multi-color image.

14. The device in claim 4 wherein the developing and superimposing means include:
- a substantially white light source;
- means for filtering the substantially white light from the light source, including a dichroic polarizer and two guest-host cells composed of electronically addressable pixels and capable of filtering light of a specific polarization, so that the light source in combination with the filter means project the second image containing both black and the second opponent color vector; and
- means for focusing the second image onto a projection surface so that the second image is superimposed with the first image, producing a multi-color image.

15. The device in claim 4 wherein the developing and superimposing means include:
- a first black/white CRT for projecting the first image in the first opponent color vector on a screen;
- means for projecting substantially white light;
- means for filtering the substantially white light, including a first dichroic polarizer, a neutral density polarizer, and an electro-optic device composed of electronically addressable pixels and capable of rotating the direction of light polarization, so that the white light source in combination with the filter means project the second image in the second opponent color vector, superimposed on the first image.

16. The device in claim 15 wherein the electro-optic device is a liquid crystal cell.

17. The device in claim 15 wherein the dichroic polarizer allows orange light of a first polarization to pass and cyan light of a second polarization to pass.

18. The device in claim 4 wherein the developing and superimposing means include:
- a first black/white CRT for projecting the first image in the first opponent color vector on a projection surface;
- means for projecting substantially white light;
- means for filtering the substantially white light, including a dichroic polarizer and two guest-host cells composed of electronically addressable pixels and capable of filtering light of a specific polarization, so that the light source in combination with the filter means project the second image containing both black and the second opponent color vector; and means for focusing the second image onto a projection surface so that the second image is superimposed with the first image, producing a multi-color image.

19. The device in claim 4 also including a flat panel matrix addressable display.

20. The apparatus in claim 19 wherein the first opponent color vector is the black/white opponent color vector and the second opponent color vector is the orange/cyan opponent color vector.

21. The apparatus in claim 19 wherein the first opponent color vector is the red/green opponent color vector and the second opponent color vector is the blue/yellow opponent color vector.

22. The device in claim 4 wherein the device is a flat panel matrix addressable display for generating a perceived full color image through the substantial registry of two opponent vector images, and wherein the device includes a light source and additionally comprises:

first and second guest-host electro-optic devices composed of electronically addressable pixels, the first device capable of filtering light of a first polarization and the second device capable of filtering light of a second polarization, the two devices located in parallel planes, the second device behind the first;

a patterned dichroic polarizer located behind and in a plane parallel to the second guest-host electro-optic device, the patterned dichroic polarizer having a plurality of polarizing elements and further having a plurality of non-polarizing elements;

means for superimposing the pixels of the first electro-optic device over the pixels of the second electro-optic device;

means for superimposing the elements of the patterned dichroic polarizer over the pixels of the two electro-optic devices; and address means for addressing the pixels of the two electroroptic devices to produce a display which is perceived as multi-color.

23. A flat panel matrix addressable display for generating a perceived full color image through the substantial registry of two opponent vector images, the device having a light source and comprising:

an electro-optic device composed of electronically addressable pixels and capable of rotating the direction of light polarization;

a neutral density polarizer located in the same plane as and in front of the electro-optic device for producing linear polarization;

a patterned neutral density polarizer located in the same plane as and behind the electro-optic device, the patterned neutral density polarizer having a plurality of polarizing elements and further having a plurality of non-polarizing elements;

a patterned dichroic polarizer located in the same plane as and behind the patterned neutral density polarizer, the patterned dichroic polarizer having a plurality of polarizing elements and further having a plurality of non-polarizing elements;

a first superimposition means for superimposing the polarizing elements of the patterned neutral density polarizer on the non-polarizing elements of the patterned dichroic polarizer and further for superimposing the non-polarizing elements of the patterned neutral density polarizer on the polarizing elements of the patterned dichroic polarizer;

a second superimposition means for superimposing the polarizing elements of both the patterned neutral density polarizer and the patterned dichroic polarizer over the pixels of the electro-optic device; and address means for addressing the pixels of the electro-optic device to produce a display which is perceived as multi-color.

24. The display device of claim 23 wherein the electro-optic device is a liquid crystal cell.

25. The liquid crystal cell of claim 24 wherein the cell is a twisted nematic cell.

26. The liquid crystal cell of claim 24 wherein the cell is a super-twist cell.

* * * * *